United States Patent [19]

Brogan

[11] Patent Number: 5,129,326
[45] Date of Patent: Jul. 14, 1992

[54] ORDNANCE DEVICE WITH EXPLOSION PROTECTION

[75] Inventor: Robert Brogan, Rancho Cordova, Calif.

[73] Assignee: Aerojet-General Corporation, Folsom, Calif.

[21] Appl. No.: 38,082

[22] Filed: Apr. 14, 1987

[51] Int. Cl.⁵ .............................................. F42B 41/00
[52] U.S. Cl. ...................................... 102/481; 149/37
[58] Field of Search ................ 102/481; 60/253, 255; 149/14, 15, 37

[56] References Cited

U.S. PATENT DOCUMENTS

| | | | |
|---|---|---|---|
| 4,004,516 | 1/1977 | Johnson et al. | 102/24 R |
| 4,041,217 | 8/1977 | Collins | 149/37 |
| 4,041,869 | 8/1977 | Miguel | 102/56 R |
| 4,053,337 | 10/1977 | Collins | 149/37 |
| 4,114,369 | 9/1978 | Crowley | 60/200 A |
| 4,411,199 | 10/1983 | Yates et al. | 102/481 |
| 4,442,666 | 4/1984 | Vetter | 60/39.47 |
| 4,458,482 | 7/1984 | Vetter et al. | 60/253 |
| 4,478,151 | 10/1984 | Vetter et al. | 102/481 |
| 4,494,373 | 1/1985 | Vetter et al. | 60/253 |

Primary Examiner—Daniel D. Wasil
Attorney, Agent, or Firm—Townsend and Townsend

[57] ABSTRACT

Controlled venting of combustion gases from an explosive material encased in a shell, as used in ordnance constructions such as rocket motors, warheads and bombs, is achieved by affixing a composite solid mass to the shell casing at a preselected location presenting low risk of damage to surrounding equipment or personnel. The solid mass is in two portions, the first being an ignition mix (in direct contact with the shell) which ignites at a temperature of 400° F. to 600° F. to react exothermally. The second is a reaction mix ignitable by the energy released by the ignition mix to itself release sufficient energy to degrade the metallurgical structure of the case. With the case thus weakened at a localized point, the case will rupture preferentially at that point upon an interior pressure buildup, and explosion of the entire case can be avoided.

45 Claims, 2 Drawing Sheets

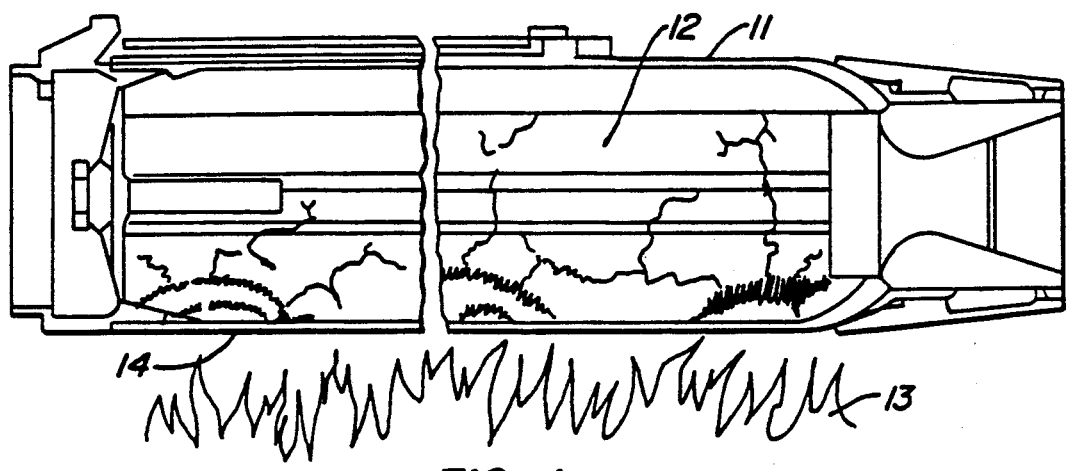
FIG._1.
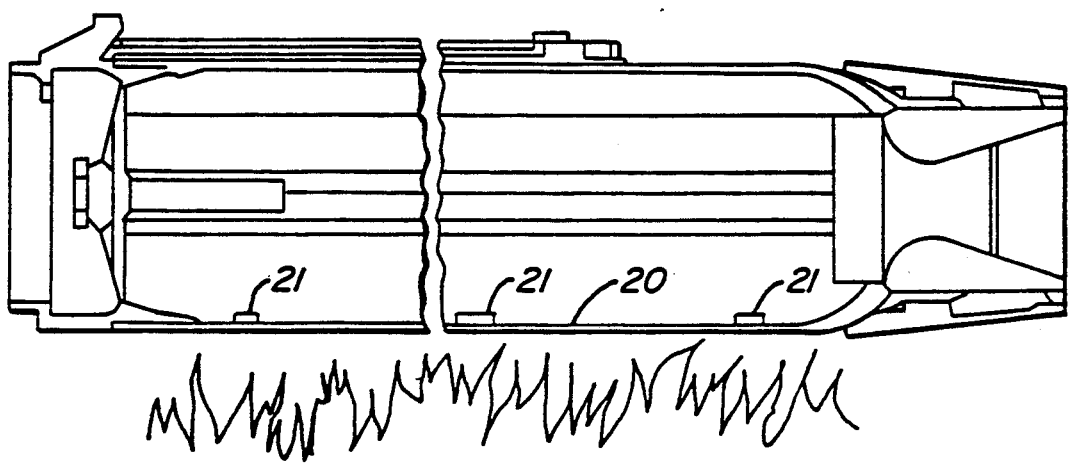
FIG._2.
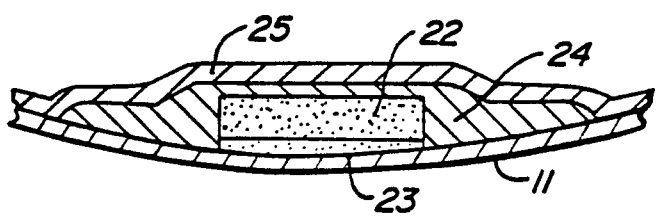
FIG._3.

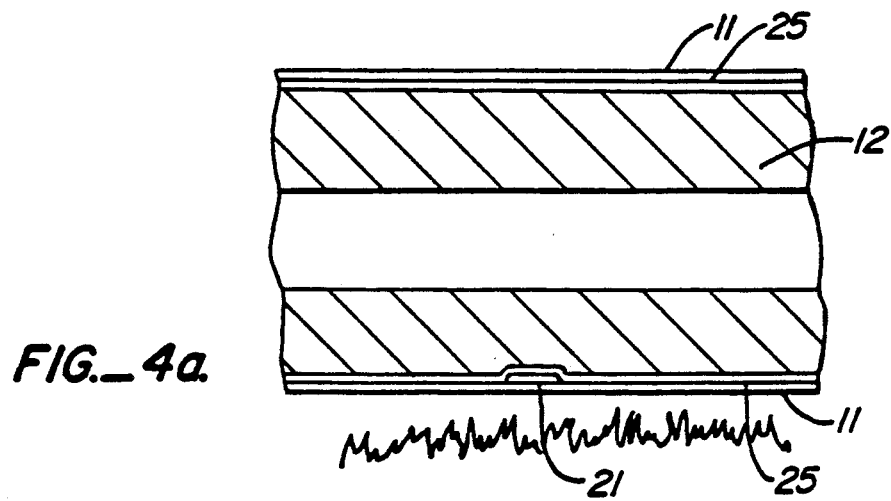
FIG._4a.
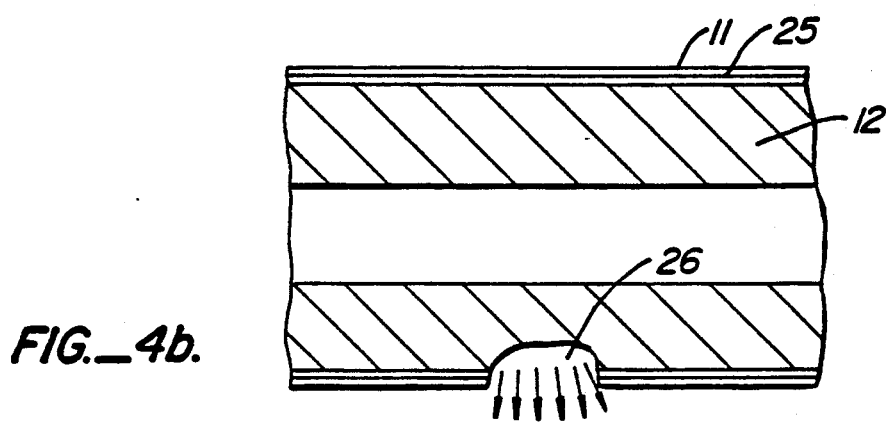
FIG._4b.
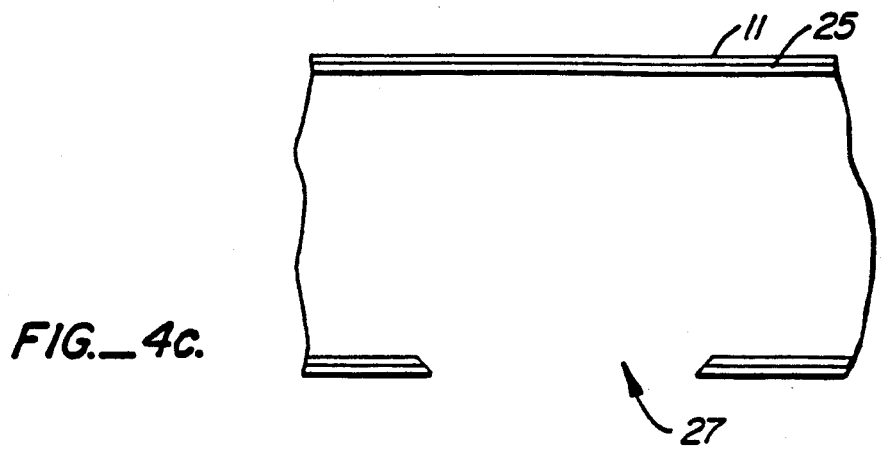
FIG._4c.

ORDNANCE DEVICE WITH EXPLOSION PROTECTION

BACKGROUND AND SUMMARY OF THE INVENTION

This invention relates to ordnance devices which do not detonate thermally, such as bombs, warheads and rocket motors. In particular, this invention addresses the hazard created by such materials when exposed to accidentally caused external fires.

The transport and storage of ordnance devices frequently requires placing them in environments which have a high probability of open flames. Ordnance is frequently placed, for example, on the flight deck of an aircraft carrier where an aircraft fuel tank is also present. Accidental rupture of the fuel tank causes the spread of fuel over the flight deck, and the fire which results upon ignition of the spilled fuel can subject the rocket motors, warheads and other ordnance devices on the deck to dangerously high temperature and a high risk of ignition of the explosive material in the ordnance devices themselves. The rapid internal pressure buildup will result in case rupture and explosion with catastrophic results, including costly equipment losses and potential loss of life.

The present invention provides ordnance devices with the capability of limiting the response to non-propulsive vent burning when the ordnance device is subjected to externally applied heat. The localized weakening of the casing enclosing the explosive material results in the opening of a small vent hole of controlled size at a predetermined location on the casing to permit discharge of the explosive material and its combustion products without danger to the remainder of the casing and hence without the shattering of the casing and the uncontrolled propulsion of pieces of the casing in all directions.

The localized effect is achieved by affixing to the casing a solid mass containing two compositions —an ignition mix which upon ignition at a relatively low temperature reacts in a substantially non-gas-producing exothermic reaction, and a main reactant mix which ignites upon absorption of the energy released by the ignition mix, the main mix itself reacting exothermically to release sufficient thermal energy to degrade the casing. The two compositions may be comprised of granulated mixtures compressed into a pellet in the form of contiguous layers having a diameter equal to that of the area sought to be weakened. The pellet may then be secured to the casing interior with the ignition mix in direct contact with the interior surface of the casing. A number of such pellets may be strategically placed at various locations along the casing to provide maximal assurance that full venting of the explosion gases will occur without rupture of the casing other than at these locations.

Features which are desired in such a system and achieved by the present invention include:

1. Reaction products which possess sufficient residual thermal energy to degrade the metallic case strength;
2. Reactions which produce little or no gas which might deform or cause breakup of the grain of the surrounding propellant or explosive of the ordnance device itself and thereby raise the explosion hazard rather than lower it;
3. A configuration which permits ignition of the external surface of the ordnance propellant (or other explosive) in preferential locations with attendant case venting;
4. Self-initiation in a fuel fire and yet lack of response to the maximum aerodynamic heating to arise during missile flight;
5. A hazard no greater than that of the ordnance propellant or explosive, while using available materials of construction; and
6. Minimum thickness, taking up as little volume and weight of the total ordnance device as possible.

Further features and embodiments of the invention will be apparent from the following description.

BRIEF DESCRIPTION OF THE DRAWINGS

FIG. 1 is a sectional view of a rocket motor during exposure to external flames and lacking the features of the present invention.

FIG. 2 is the same view as FIG. 1 except that the rocket motor case is equipped with protective devices in accordance with the present invention.

FIG. 3 is sectional view of a protective device in accordance with the present invention mounted to the casing of a piece of ordnance equipment in accordance with the invention.

FIGS. 4a, 4b, and 4c depict in sequence the stages of a rocket motor equipped with a protective device in accordance with the present invention upon exposure to external flames.

DETAILED DESCRIPTION OF THE INVENTION AND PREFERRED EMBODIMENTS

Central to the present invention is a composite solid mass affixed to the ordnance device shell at the location where localized venting is desired. The solid mass is comprised of two reactant mixes: one (an ignition mix) to be ignited at an early stage of exposure to the heat resulting from external flames, and the other (the main mix) to be ignited by the first and to generate sufficient heat of its own to weaken the metallurgical structure of the shell.

The compositions are preferably formed into a pellet having two contiguous layers, one made up of each of the two mixes. The layered pellet is preferably affixed to the interior wall of the shell, with the ignition mix layer in direct contact with the shell wall. An advantage of the layered arrangement, particularly when the pellet is held in place by a pellet holder such as a bracket or cup riveted or welded to the casing interior, is that it provides protection against responding to heat generated within the ordnance device itself during normal motor burning. As the propellant surface within the motor regresses during normal motor burning, the pellet holder becomes exposed first to the heat just prior to complete propellant burnout. The pellet holder and the main mix thus insulate the ignition mix from the propellant-generated heat.

Attachment of the pellet to the inside surface of the casing may be achieved by conventional means. Examples include the use of adhesives as well as the use of brackets or cups riveted or welded to the casing interior. The pellet may be sized to provide the maximum sensitivity and heat-release effect while localizing the venting to a restricted area of preselected size.

Each of the two compositions is a mixture of reactants which upon reaching an ignition temperature will spontaneously react in a substantially non-gas-producing exothermic reaction. The term "substantially non-gas-producing" is used herein to denote a reaction which produces little or no gaseous products, and in any event, at most such a small amount of gas that the grain structure of the ordnance explosive is not broken up or otherwise deformed to the extent that an explosive hazard is created rather than avoided.

The reactants of the ignition mix will be selected to ignite at a temperature within a relatively low range, and those of the main mix will be selected to react upon absorption of the energy released by the ignition mix, and to itself release sufficient thermal energy to lessen the tensile strength of the adjacent shell to a sufficient extent to cause that portion of the shell to rupture preferentially upon a pressure increase inside the ordnance device.

Selection of the temperature at which the ignition mix should ignite (and hence selection of the ignition mix itself) will be made with due consideration toward avoidance of undesired responses. In particular, the ignition temperature should be below the temperature at which explosion of the motor itself will occur in a fuel fire, and yet above the temperature which will result from the maximum aerodynamic heating during normal missile flight. While these limits will vary from one missile to the next, an appropriate temperature range in general will be from about 400° F. to about 600° F. (204°–316° C.).

In preferred compositions, the reactants are a metal and an oxidizing agent for the metal, in granular or particulate form. Examples of metals for the ignition mix are magnesium, tin, zinc, calcium, and a combination of calcium and aluminum. Preferred metals are tin, calcium, and a combination of calcium and aluminum. Likewise, examples of oxidizing agents are cupric oxide (CuO) and sulfur. Preferred combinations are tin and cupric oxide; calcium and sulfur; and calcium, aluminum and sulfur. The combination of calcium, aluminum and sulfur is particularly preferred, with the mole ratio of calcium to sulfur falling within the range of about 0.5 to about 2.0, preferably from about 0.75 to about 1.25; and the mole ratio of aluminum to sulfur falling within the range of about 0.3 to about 1.5, preferably from about 0.5 to about 1.0.

A preferred metal for the second (main) reactant composition is aluminum. Examples of oxidizing agents are ferric oxide ($Fe_2O_3$), cuprous oxide ($Cu_2O$), cobaltosic oxide ($Co_3O_4$) and tungsten trioxide ($WO_3$). A mix containing aluminum and tungsten trioxide is preferred, particularly with the further inclusion of sulfur. Mole ratios of aluminum to tungsten trioxide ranging from about 1.0 to about 4.0 will provide the best results, with about 1.5 to about 2.5 preferred.

The relative amounts of the two compositions are not critical. In general, however, a weight ratio of the second reactant composition (main mix) to the first (the ignition mix) ranging from about 4.0 to about 10.0, preferably from about 3.0 to about 5.0, will provide the best results.

A single ordnance casing will generally be supplied with a plurality of discrete pellets of the layered reactant mixes in accordance with the invention, the various pellets being strategically placed to provide maximum venting with a minimum of structural damage to the casing and minimum risk of rupture of the casing at regions other than those bearing the pellets. The optimum number in any particular case is readily ascertained by one skilled in the explosives art and is within the routine skill thereof. The number and placement of the pellets will depend upon the shape and size of the ordnance casing, as well as the amount and nature of explosive material contained inside. In most applications, one composite pellet will be used for each approximately 20 to approximately 50 pounds (9–23 kg) of explosive material contained in the casing. The size of the second reactant composition (main mix) in each pellet is preferably from about 0.5 to about 20 cubic centimeters, preferably from about 1.0 to about 5.0 cubic centimeters. Also, in preferred applications, a sufficient number of strategically placed pellets are included to provide a total volume of from about 2.0 to about 50 cubic centimeters, preferably from about 5.0 to about 10 cubic centimeters of main mix per 100 pounds (45 kg) of the explosive material in the casing.

Optimum values for the diameter and thickness of each pellet depend primarily on the thickness of the steel wall to be melt vented. For example, a 0.20 inch thick (0.4 cm) pellet has been found to be adequate to efficiently melt a 0.06 inch thick (0.15 cm) steel wall. An upper limit on the wall thickness has not been established.

Turning now to the figures, a cut-away view of a rocket motor with a steel motor case is shown in FIG. 1. The steel case 11 surrounds a core of granulated propellant material 12. The motor is secured to aircraft stationed on the flight deck of an aircraft carrier (not shown). Flames 13 on the deck immediately below the motor case are the result of an accidental fuel fire caused by fuel spillage at a neighboring location on the same deck. The flames may reach only the bottom surface 14 of the motor case or may engulf the entire motor case. The case itself will rise quickly in temperature due to direct contact with the flames, while the interior, including the propellant material 12 and an insulation liner (seen in subsequent drawings) will rise in temperature at a slower rate by conduction from the case. As the temperature of the propellant material rises, cracking of the propellant grain occurs (as shown), and the pressure begins to build rapidly. Eventually the pressure exceeds the withholding capability of the steel case 11 and the entire motor explodes, shooting case fragments in all directions.

To prevent this from happening, the motor is modified according to FIG. 2. Here, the inside surface 20 of the steel case is provided with pellets 21 of the reactant composites of the present invention. The locations where the pellets are placed are those specifically selected for localized venting of gases from the steel case as a result of the temperature rise. Selection of these sites at the lower surface of the case as shown directs all venting down toward the deck of the aircraft carrier, the direction which will be least harmful to the surrounding equipment and personnel in the area. The pellets are spaced to minimize pressure variations within the ignited propellant and provide for efficient discharge of the propellant and combustion gases.

FIG. 3 is a detailed view of one of the pellets and the region of the steel case 11 at which the pellet is attached. Here the two layers of the pellet are seen, the upper layer 22 containing the main mix and the lower layer 23 containing the ignition mix. It will be noted that the ignition mix is placed in direct contact with the steel case 11, to ignite during the early stages of the temperature rise in the case itself, prior to the temperature in the explosive material forming the interior of the rocket motor reaching its own ignition temperature.

Upon ignition at this relatively low temperature (400°-600° F). the ignition mix in the lower layer reacts exothermally to ignite the mix of the upper layer 22 whose exothermic reaction produces sufficient heat to raise the temperature of the steel case immediately below it to a level sufficiently high to degrade its metallurgical structure, rendering it substantially more vulnerable to rupture than the surrounding regions. A rubber cup 24 secures the pellet against the case 11. An insulating liner 25 is normally present in rocket motor casings of this kind. It will be noted that the pellet and its holder cup 24 are placed between the steel case 11 and the liner 25.

FIGS. 4a, 4b, 4c provide a sectional view of a rocket motor case in the region surrounding one pellet. The steel case 11 and insulating liner 25 are shown, with the explosive material or propellant grain 12 occupying an annular space inside the case. The pellet 21 is placed between the case and the insulation liner. As the flames in FIG. 4a raise the temperature of the case 11, the exothermic reactions undergone by the pellet degrade the case strength in the region contacting the pellet. The case soon ruptures in this region, and non-propulsive vent burning occurs through the case wall as shown in FIG. 4b. The vent hole 26 has expanded beyond the diameter of the pellet 21, but is still localized. Combustion gases are discharged downward in the direction shown by the arrows. The explosive material 12 inside the casing will continue to burn until it is entirely consumed. The vent hole 26, however permits burnout to occur in a controlled manner, without explosion, detonation or deflagration. The chamber after burnout is shown in FIG. 4c, with all regions of the case still intact except for an enlarged vent hole 27 through which the explosive material has escaped.

This invention is applicable to the types of ordnance devices which contain explosive material which is activated by a booster charge upon initiation of the latter by an electrical signal. This is distinguished from explosive materials which are designed for thermal detonation.

The following examples are offered for illustration. They are intended neither to define nor limit the invention in any manner.

EXAMPLE 1

A test was conducted on a rocket motor equipped with a pellet in accordance with the present invention by placing the motor in a test stand over two propane burners. The details were as follows:

Rocket Motor: A short length Aerojet Mk 52 Mod 2—length: 10 in. (25 cm) between forward and aft closures; annular propellant web: ammonium perchlorate/polybutadiene with 5% aluminum; 8 in. (20 cm) outer diameter, 3 in. (7.6 cm) inner diameter; steel case 0.060 in. (0.15 cm) thick; insulation liner: polybutadiene, 0.050 in. (0.13 cm) thick.

Pellet Composition:

| Main Mix: (upper layer): | |
|---|---|
| WO$_3$ | 74.29% (weight basis) |
| Al | 21.14% |
| S | 4.57% |
| diameter | 0.875 in. (2.2 cm) |
| thickness | 0.20 in. (0.5 cm) |
| weight | 7.4 g. |
| Ignition Mix: (lower layer) | |
| Ca (coated with protective oil) | 44.47% |
| Al | 19.96% |
| S | 35.57% |
| diameter | 0.875 in. (2.2 cm) |
| weight | 2.0 g. |

Pellet Placement: a single pellet secured to the internal surface of the steel case with a rubber cap (polybutadiene/epoxy rubber with inorganic fillers) at the length midpoint.

Fuel Fire: two propane gas burners located underneath the motor.

Because the propane flame burns in a clean manner, performance of the device could be assessed visually, and analysis was done by a video recording. Following ignition of the propane fire, successful steel case venting occurred through the underside of the motor at the pellet location. The venting area expanded as the propellant gases were expended through the case. The motor remained in the test stand throughout the duration of the test, by the end of which all energetic material had burned out of the motor and there was no evidence of any reaction more severe than simple burning.

EXAMPLE 2

A test was conducted on a rocket motor equipped with pellets in accordance with the present invention by placing the motor on an A-frame over a pit containing a burning fuel. The details were as follows:

Rocket Motor: Aerojet Sparrow Motor MK52 Mod. 2—length: 36 in. (92 cm) between forward and aft boots; annular propellant web: ammonium perchlorate/polybutadiene with 5% aluminum; 8 in. (20 cm) outer diameter, 3 in. (7.6 cm) inner diameter; steel case 0.060 in. (0.15 cm) thick; insulation liner: polybutadiene, 0.070 in. (0.18 cm) thick.

Pellet Composition:

| Main Mix: (upper layer): | |
|---|---|
| WO$_3$ | 74.29% (weight basis) |
| Al | 21.14% |
| S | 4.57% |
| diameter | 0.875 in. (2.2 cm) |
| thickness | 0.20 in. (0.5 cm) |
| weight | 7.4 g. |
| Ignition Mix: (lower layer) | |
| Ca (coated with protective oil) | 44.47% |
| Al | 19.96% |
| S | 35.57% |
| diameter | 0.875 in. (2.2 cm) |
| weight | 2.0 g. |

Pellet Placement: secured to the internal surface of the steel case with rubber caps (polybutadiene/epoxy rubber with inorganic fillers) along the bottom centerline of the motor at distances of 9 in. (23 cm), 17 in. (43 cm), 26 in. (66 cm) and 34 in. (86 cm) from the aft chamber face—four pellets total.

Fuel Fire: 1000 gal. (3785 Liters) kerosene (military designation JP-5) plus 25 gal. (946 liters) gasoline, in a circular pit 28 feet (8.53 meters) in diameter.

| Average Flame Temperature: | 1641° F. (894° C.) |
|---|---|
| Ambient Temperature: | 80° F. (26.7° C.) |

| | |
|---|---|
| Wind: | 2–4 knots SW (3.7–7.4 km/h) |

Four thermocouples were placed outside the motor to measure the fuel fire temperature (referred to above); one thermocouple was mounted through the nozzle to measure the motor bore temperature; and a pressure transducer was mounted through the igniter boss to measure the motor bore pressure. The sequence of events following ignition of the fuel fire is shown in the following table.

| Time after Fuel Fire Ignition (sec) | Observations |
|---|---|
| 41.5 | First indication of bore temperature rise |
| 72.5 | Vent noise; starboard plume visible |
| 74.0/74.5 | Bore temperature rise rate increases (105/313° F.) |
| 74.5 | Starboard plume terminates |
| 83.5/84.0 | Bore temperature rise rate increases (666/925° F.) |
| 85.39 | First indication of bore pressure rise |
| 85.5 | Vent noise; burning |
| 85.54 | Bore pressure peaks at 23 psi |
| 86.5 | Vent noise; burning |
| 104.5 | Reactions complete |

Throughout the test, there was no evidence of any reaction more severe than simple burning. At the end of the test, all motor components were either still hanging on the A-frame or were resting in the pit directly below the point where they were hung, and all energetic material had been burned out of the motor. This indicates that no explosions had occurred and that the energetic material had vented entirely through the motor casing.

The foregoing is offered primarily for purposes of illustration. It will be readily apparent to those skilled in the art that numerous modifications and variations from the materials, procedures and structural details disclosed above may be introduced without departing from the spirit and scope of the invention.

What is claimed is:

1. In an ordnance device containing explosive material encased in a shell, which presents an explosion hazard when subjected to externally applied heat, the improvement comprising:
   (a) a composite solid mass comprising:
      (1) a first reactant composition which is ignited at a temperature ranging from about 400° F. to about 600° F. to a substantially non-gas-producing exothermic reaction: and
      (2) a second reactant composition which is ignited by energy released by said substantially non-gas-producing exothermic reaction to release sufficient thermal energy to said shell when placed substantially adjacent thereto to substantially lessen the tensile strength thereof; and
   (b) means for affixing said composite solid mass to said shell at a preselected location.

2. An ordnance device in accordance with claim 1 in which said preselected location is on the interior surface of said shell.

3. An ordnance device in accordance with claim 1 in which said affixing means places said first reactant composition in contact with said shell.

4. An ordnance device in accordance with claim 1 in which said first and second reactant compositions form contiguous layers.

5. An ordnance device in accordance with claim 1 in which each of said first and second reactant compositions is a cohesive mixture of particulate reactants.

6. An ordnance device in accordance with claim 1 in which said first reactant composition is comprised of a metal and an oxidizing agent therefor.

7. An ordnance device in accordance with claim 6 in which said metal is a member selected from the group consisting of magnesium, tin, zinc, calcium, and a combination of calcium and aluminum, and said oxidizing agent is a member selected from the group consisting of cupric oxide and sulfur.

8. An ordnance device in accordance with claim 6 in which said metal is a member selected from the group consisting of tin, calcium, and a combination of calcium and aluminum, and said oxidizing agent is a member selected from the group consisting of cupric oxide and sulfur.

9. An ordnance device in accordance with claim 1 in which said second reactant composition is comprised of a metal and an oxidizing agent therefor.

10. An ordnance device in accordance with claim 9 in which said metal is aluminum and said oxidizing agent is a member selected from the group consisting of ferric oxide, cuprous oxide, cobaltosic oxide and tungsten trioxide.

11. An ordnance device in accordance with claim 1 in which the weight ratio to said second reactant composition to said first reactant composition is from about 3.0 to about 5.0.

12. An ordnance device in accordance with claim 1 containing a plurality of said composite solid masses, one for each approximately 20 to approximately 50 pounds of said explosive material.

13. An ordnance device in accordance with claim 1 in which the volume of said second reactant composition is from about 0.5 to about 20 cubic centimeters and said ordnance device contains a plurality of said composite solid masses to provide a total volume of from about 2.0 to about 50 cubic centimeters of said second reactant composition per 100 pounds of said explosive material.

14. An ordnance device in accordance with claim 1 in which the volume of said second reactant composition is from about 1.0 to about 5.0 cubic centimeters and said ordnance device contains a plurality of said composite solid masses to provide a total volume of from about 5.0 to about 10 cubic centimeters of said second reactant composition per 100 pounds of said explosive material.

15. In an ordnance device containing explosive material encased in a shell, which presents an explosion hazard when subjected to externally applied heat, the improvement comprising:
   (a) a pellet comprising:
      (1) a first layer comprising a first mixture comprising calcium and sulfur which is ignitable at a temperature ranging from about 400° F. to about 600° F.; and
      (2) a second layer comprising a second mixture comprising tungsten trioxide and aluminum: and (b) means for affixing said pelletized mass to the interior surface of said shell with said first layer in contact with said interior surface.

16. An ordnance device in accordance with claim 15 in which said first mixture further comprises aluminum.

17. An ordnance device in accordance with claim 15 in which said second mixture further comprises sulfur.

18. An ordnance device in accordance with claim 15 in which the mole ratio of calcium to sulfur in said first mixture is from about 0.5 to about 2.0.

19. An ordnance device in accordance with claim 15 in which the mole ratio of calcium to sulfur in said first mixture is from about 0.75 to about 1.25.

20. An ordnance device in accordance with claim 15 in which the mole ratio of aluminum to tungsten trioxide in said second mixture is from about 1.0 to about 4.0.

21. An ordnance device in accordance with claim 15 in which the mole ratio of aluminum to tungsten trioxide in said second mixture is from about 1.5 to about 2.5.

22. A method for localizing the venting of gases from a shell containing explosive material at a preselected location on said shell upon ignition of said explosive material by heat externally applied to said shell, said method comprising affixing to said shell at said preselected location a composite solid mass comprising:
   (a) a first reactant composition which ignites at a temperature ranging from about 400° F. to about 600° F. to a substantially non-gas-producing exothermic reaction; and
   (b) a second reactant composition which is ignited by energy released by said substantially non-gas-producing exothermic reaction to release sufficient energy to said shell at said preselected location to substantially lessen the tensile strength thereof.

23. A method in accordance with claim 22 comprising affixing said composite solid mass to the interior surface of said shell.

24. A method in accordance with claim 22 in which said first and second reactant compositions form contiguous layers and said method comprises affixing said composite solid mass to the interior surface of said shell with said first reactant composition in contact therewith.

25. A method in accordance with claim 22 in which said first and second reactant compositions are cohesive mixtures of particulate reactants, and said first and second reactant compositions form contiguous layers.

26. A method in accordance with claim 22 in which said first reactant composition is comprised of a metal and an oxidizing agent therefor.

27. A method in accordance with claim 26 in which said metal is a member selected from the group consisting of magnesium, tin, zinc, calcium and a combination of calcium and aluminum, and said oxidizing agent is a member selected from the group consisting of cupric oxide and sulfur.

28. A method in accordance with claim 26 in which said metal is a member selected from the group consisting of tin, calcium and a combination of calcium and aluminum, and said oxidizing agent is a member selected from the group consisting of cupric oxide and sulfur.

29. A method in accordance with claim 26 in which said metal is a combination of calcium and aluminum and said oxidizing agent is sulfur.

30. A method in accordance with claim 22 in which said second reactant composition is comprised of a metal and an oxidizing agent therefor.

31. A method in accordance with claim 30 in which said metal is aluminum, and said oxidizing agent is a member selected from the group consisting of ferric oxide, cuprous oxide, cobaltosic oxide and tungsten trioxide.

32. A method in accordance with claim 30 in which said metal is aluminum and said oxidizing agent is tungsten trioxide.

33. A method in accordance with claim 30 in which said metal is aluminum and said oxidizing agent is tungsten trioxide, and said second reactant composition further comprises sulfur in an amount sufficient to enhance the agglomeration of reactant products produced upon ignition of said second reactant composition.

34. A method in accordance with claim 22 in which the weight ratio of said second reactant composition to said first reactant composition is from about 1.0 to about 10.0.

35. A method in accordance with claim 22 in which the weight ratio of said second reactant composition to said first reactant composition is from about 3.0 to about 5.0.

36. A method in accordance with claim 22 comprising affixing a plurality of said composite solid masses to the interior surface of said shell at preselected locations, one said composite solid mass for each approximately 20 to approximately 50 pounds of said explosive material.

37. A method in accordance with claim 22 in which the volume of said second reactant composition is from about 0.5 to about 20 cubic centimeters and said method comprises affixing a plurality of said composite solid masses to said shell at preselected locations to provide a total volume of from about 2.0 to about 50 cubic centimeters of said second reactant composition per 100 pounds of said explosive material.

38. A method in accordance with claim 22 in which the volume of said second reactant compositions from about 1.0 to about 5.0 cubic centimeters and said method comprises affixing a plurality of said composite solid masses to said shell at preselected locations to provide a total volume of from about 5.0 to about 10.0 cubic centimeters of said second reactant composition per 100 pounds of said explosive material.

39. A method for localizing the venting of gases from a shell containing explosive material at a preselected location on said shell upon ignition of said explosive material by heat externally applied to said shell, said method comprising affixing to the interior surface said shell at said preselected location a pellet comprising:
   (a) a first layer comprising a mixture of particulate calcium and sulfur which is ignitable at a temperature ranging from about 400° F. to about 600° F.; and
   (b) a second layer comprising a mixture of particulate aluminum and tungsten trioxide;
   with said first layer in contact with said interior surface.

40. A method in accordance with claim 39 in which said first layer further comprises aluminum.

41. A method in accordance with claim 39 in which said second layer further comprises sulfur.

42. A method in accordance with claim 39 in which the mole ratio of calcium to sulfur in said first layer is from about 0.5 to about 2.0.

43. A method in accordance with claim 39 in which the mole ratio of calcium to sulfur in said first mixture is from about 0.75 to about 1.25.

44. A method in accordance with claim 39 in which the mole ratio of aluminum to tungsten trioxide in said second mixture is from about 1.0 to about 4.0.

45. A method in accordance with claim 39 in which the mole ratio of aluminum to tungsten trioxide in said second mixture is from about 1.5 to about 2.5.

* * * * *